Patented Dec. 9, 1947

2,432,440

UNITED STATES PATENT OFFICE 2,432,440

MANUFACTURE OF LUBRICATING OIL

John A. Patterson, Wappingers Falls, N. Y., assignor to The Texas Company, New York, N. Y., a corporation of Delaware No Drawing. Application March 15, 1945, Serial No. 582,991

1 Claim. (Cl. 252—45)

This invention relates to the treatment of hydrocarbon oils to effect improvement in oxidation stability. The invention is directed particularly to the treatment of lubricating stocks to produce lubricating oils highly resistant to oxidation adapted for turbine oils, lubricating oils for internal combustion engines and the like.

In accordance with the invention the hydrocarbon oil is treated with sulfur to effect reactions which produce a marked improvement in oxidation stability.

In practicing the invention, the oil is contacted with a small amount of sulfur, approximating 1-2 per cent by weight of the oil treated, and subjected to temperatures adapted to support an effective reaction to produce the desired improvement in resistance to oxidation. Suitable temperatures for the reaction are within a range of about 300–450° F. It is preferred to use temperatures somewhat in excess of 300° F. and there appears to be no advantage in the use of temperatures higher than 450° F., since fully as satisfactory results can be obtained at the lower temperatures. The most satisfactory results have been obtained at temperatures approximating 380–400° F. A time of reaction of about 1–2 hours is adequate to produce the desired improvement in oxidation stability. Prolonging the time beyond such period does not appear to give any advantage. Thus, for example, when the amount of sulfur was reduced to 0.5 per cent and the time was extended to 7 hours the treatment produced some increase in oxidation stability but the increase was moderate compared to the improvement obtained by using proportions of sulfur amounting to 1 or 2 per cent with times of reaction of about 1–2 hours.

After the contacting with the sulfur, the oil is treated to remove any free sulfur remaining in the oil, such as by agitation with an alkaline solution of sodium sulfide and given such additional purifying or refining treatment as may be requisite for the particular product desired.

The treatment with the sulfur is applied to the oil after it has received refining treatments such as treatment with sulfuric acid, solvent refining with furfural or liquid sulfur dioxide and the like. A remarkable feature of the invention is that stocks which have previously been highly refined may, by the treatment with the sulfur, be greatly increased in resistance to oxidation. Thus, for example, the sulfur treatment may be applied to the treatment of lubricating oils which have been highly refined by treatment with acid and by solvent treatment to produce oils which, after removal of the free sulfur and after being finished either by washing, steaming and clay filtering or by acid treating, neutralizing and clay filtering, will be found to have a sufficiently increased oxidation stability, as determined by the A. S. T. M. Turbine Oil Oxidation test (Proposed Method for Determining Oxidation Characteristics of Turbine Oils, section III, Technical Committee C, A. S. T. M. Committee D–2, June 29, 1941), as to meet the rigid oxidation stability requirements of a superior turbine oil. Finishing treatments of this character do not destroy the oxidation stability imparted to the oil by the sulfur treatment.

The nature and extent of the finishing treatment applied to the oil after the sulfur treatment will depend on the particular product desired and on the character of the previous refining to which the oil may have been subjected. The free sulfur should be entirely removed and the combined sulfur should be reduced to the extent necessary to meet specifications for the product.

The treatment with the sulfur may be conducted in an atmosphere of inert gas such as nitrogen or carbon dioxide in order to prevent oxidation during the treatment.

In a specific example the invention was applied to the treatment of a paraffin base stock. A paraffin base crude oil was subjected to vacuum distillation, a distillate cut was treated with sulfuric acid and neutralized, dewaxed by pressing and the pressed distillate rerun over caustic. A distillate cut was treated with sulfuric acid and neutralized, solvent refined with liquid sulfur dioxide and then subjected to anti-gravity filtration through fuller's earth producing a high grade lubricating oil product of 147/100 Saybolt Universal viscosity. The A. S. T. M. Turbine Oil Oxidation test life of this oil was 82 (expressed as the number of hours required for the oil to reach a neutralization number of 2).

In order to improve the oxidation stability the oil was treated with 2 per cent by weight of sulfur for a period of one hour at a temperature of 380–390° F. During this treatment carbon dioxide was bubbled through the oil in order to prevent oxidation. The treated product was agitated with a caustic soda solution of sodium sulfide to effect removal of the free sulfur. The oil was then washed with water and steamed, the water separated and the oil filtered. The treated product contained no free sulfur and had an A. S. T. M. Turbine Oil Oxidation test life of 1300.

In a second run with the refined paraffin base lubricating oil the oil was treated with 1 per cent of sulfur for a period of one hour at a temperature of 380–390° F. The sulfur-treated oil was agitated with a caustic soda solution of sodium sulfide to effect removal of the free sulfur. The oil was then treated with sulfuric acid, water coagulated, settled at normal temperature, neutralized with sodium carbonate solution, steamed and blown bright and finally percolated through fuller's earth at a temperature of 100° F. The A. S. T. M. Turbine Oil Oxidation test life of the product was 291 and the product contained no free sulfur and satisfactorily met the Navy Emulsion test at 130° F., using distilled water.

In another example the invention was applied to the treatment of naphthene base stock. A naphthene base crude oil was distilled producing a lubricating distillate cut which was rerun over caustic with vacuum distillation. A distillate cut was solvent refined with furfural, acid treated and neutralized and finally subjected to anti-gravity filtration through fuller's earth. The highly refined product had a Saybolt Universal viscosity of 490 seconds at 100° F. and an A. S. T. M. Turbine Oil Oxidation test life of 65. The oil contained no free sulfur and the total sulfur was 0.14%.

For the purpose of improving the oxidation stability of this refined naphthene base lubricating oil it was treated with 1 per cent sulfur for a period of one hour at a temperature of 380–400° F. The sulfur-treated oil was agitated with alkaline sodium sulfide to remove the free sulfur and was found to contain 0.2% total sulfur. The oil was then treated with sulfuric acid, water coagulated, settled at normal temperature, neutralized with sodium carbonate solution, steamed and blown bright and finally percolated through fuller's earth at a temperature of 100° F. The product contained no free sulfur and had an A. S. T. M. Turbine Oil Oxidation test life of 605.

Oxidation inhibitors such as tetramethyldiaminodiphenylmethane and inhibitors having similar stabilizing properties may be added to the sulfur treated oil in order to obtain added resistance to oxidation.

Although a preferred embodiment of the invention has been described herein, it will be understood that various changes and modifications may be made therein, while securing to a greater or less extent some or all of the benefits of the invention, without departing from the spirit and scope thereof.

I claim:

In the manufacture of lubricating oil of superior oxidation stability adapted for turbine oil the process that comprises first subjecting a distillate petroleum lubricating stock to acid treating and solvent refining to produce a highly refined oil, then treating the highly refined oil with about 1–2% by weight of sulfur at a temperature within the range of 300–450° F. for a period of about 1–2 hours to thereby effect reactions producing increased oxidation stability and finally treating the oil with an alkaline solution of sodium sulfide to effect removal of free sulfur without impairing the oxidation stability of the product.

JOHN A. PATTERSON.

REFERENCES CITED

The following references are of record in the file of this patent:

UNITED STATES PATENTS

| Number | Name | Date |
| --- | --- | --- |
| 2,356,843 | Henry | Aug. 29, 1944 |
| 2,222,431 | Colin | Nov. 19, 1940 |
| 2,159,908 | Nill | May 23, 1939 |
| 2,045,306 | Nelson | June 23, 1936 |
| 2,314,530 | Tighe | Mar. 23, 1943 |
| 1,975,987 | Stratford | Oct. 9, 1934 |
| 2,034,837 | Schulze et al. | Mar. 24, 1936 |
| 2,020,661 | Schulze et al. | Nov. 12, 1935 |
| 2,142,916 | Parkhurst | Jan. 3, 1939 |